ELECTRIC PULSE CODING ARRANGEMENTS

Filed June 6, 1955 2 Sheets-Sheet 1

*Inventor*
C. G. TREADWELL
*By* [signature]
*Attorney*

March 4, 1958 C. G. TREADWELL 2,825,873

ELECTRIC PULSE CODING ARRANGEMENTS

Filed June 6, 1955 2 Sheets-Sheet 2

*Inventor*
C. G. TREADWELL
*By*
*Attorney*

2,825,873

ELECTRIC PULSE CODING ARRANGEMENTS

Cyril Gordon Treadwell, London, England, assignor to International Standard Electric Corporation, New York, N. Y., a corporation of Delaware Application June 6, 1955, Serial No. 513,405

Claims priority, application Great Britain July 12, 1954

5 Claims. (Cl. 332—11)

The present invention relates to coding arrangements for electric pulse code communication systems.

The invention concerns a coder for the particular form of the binary code which is sometimes called the cyclic permutation code, and has the property that for any change of one step in the quantised amplitude of the signal wave to be coded, only one digit pulse appears or disappears. This form of the binary code has the advantage that coding errors are not likely to produce serious errors in the reproduced signal amplitude.

The principal object of the invention is to simplify the circuit arrangements of coders for the cyclic permutation code.

This object is achieved according to the invention by providing an electric pulse coding arrangement for producing a code group of digit pulses according to the cyclic permutation code comprising means for applying a sample pulse, the amplitude of which is to be translated into corresponding code group of pulses, to the input terminal of an amplitude doubling amplifier through an autotransformer winding having a centre tapping point connected through a rectifier to a polarizing direct current source of given potential in such manner that the rectifier is normally blocked, the arrangement being such that the potential applied to the said input terminal increases with increase of the amplitude of the sample pulse until the said amplitude reaches the given potential, and then, after the rectifier becomes unblocked, decreases with further increase in the said amplitude, and means for generating a digit pulse when the amplitude of the applied sample pulse is equal to, or greater than, the given potential.

The invention will be described with reference to the accompanying drawings in which.

Figure 1:
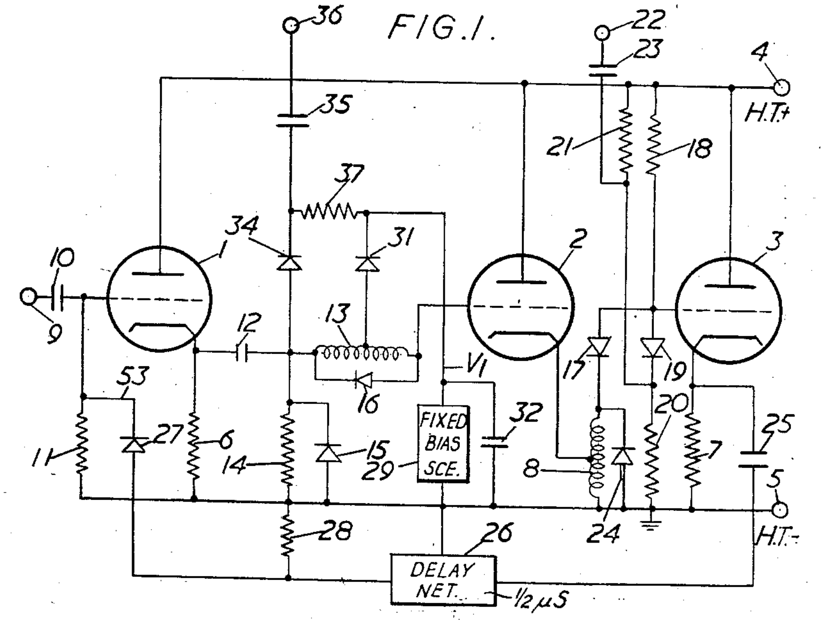
Fig. 1 shows a schematic circuit diagram of an embodiment of the invention.

The coder circuit shown in Fig. 1 is basically of a known type in which a short sample pulse whose amplitude represents the amplitude of a sample of a signal wave to be coded is circulated several times round a closed coding loop after having its amplitude modified during each trip round the loop, a digit pulse being generated only when the amplitude of the pulse is not less than a fixed value at a specified point in the loop.

The coder circuit comprises three valves 1, 2, 3, all of which are arranged as cathode follower amplifiers with large negative feedback, so that the voltage gain ratio is in each case substantially equal to 1. The anodes are connected directly to the positive terminal 4 of the high tension source (not show), the corresponding negative terminal 5 being connected to ground. The cathodes of the valves 1 and 3 are connected to ground through resistors 6 and 7 and the cathode of the valve 2 is connected to ground through the lower part of the winding of a closely coupled autotransformer 8, the function of which will be explained later.

A train of short positive amplitude-modulated pulses representing samples of the signal waves of one or more channels is applied to an input terminal 9 connected to the control grid of the valve 1 through a blocking capacitor 10. The duration of these sample pulses will be assumed to be ½ microsecond. A grounded leak resistor 11 is provided for the control grid of the valve 1.

The sample pulses with their amplitudes substantially unaltered are supplied from the cathode of the valve 1 through a blocking capacitor 12 and a closely coupled, centre-tapped, autotransformer winding 13 to the control grid of the valve 2. This autotransformer represents the characteristic feature of the invention. The junction point of elements 12 and 13 is connected to ground through a resistor 14 shunted by a rectifier 15 directed in such manner as to prevent the potential of the upper end of resistor 14 from becoming negative. A rectifier 16 shunts the autotransformer winding 13, and is directed to prevent the left hand terminal of the winding from becoming negative relative to the right hand terminal, for damping out any oscillations which may be produced.

The upper end of the autotransformer winding 8 is connected to the control grid of the valve 3 through a rectifier 17. This control grid is also connected to terminal 4 through a resistor 18, and to ground through a rectifier 19 and a resistor 20. The junction point of elements 19 and 20 is connected to terminal 4 through a resistor 21, and to an input terminal 22 through a capacitor 23. The rectifiers 17 and 19 are directed so that they will both normally be unblocked. A negative blocking pulse is applied to terminal 22 for terminating the operation of the coder when the generation of each pulse code group has been completed. The autotransformer winding 8 is shunted by a rectifier 24 directed in such manner as to prevent the potential of the upper terminal from becoming negative.

The cathode of the valve 3 is connected through a blocking capacitor 25, a delay network 26, a rectifier 27, and a conductor 53, to the control grid of the valve 1, thereby completing the coding loop circuit. The rectifier 27 is directed to pass positive pulses to the valve 1.

A terminating resistor 28 is provided for the delay network 26. This delay network produces a delay of for example ½ microsecond.

The centre tap of the autotransformer winding 13 is connected through a rectifier 31 to the positive terminal of a bias source 29 of potential $V_1$, the negative terminal of which is connected to ground. The rectifier 31 is directed so that it will be blocked until the potential of the centre tap of the winding 13 just equals $V_1$. The source 29 is shunted by a by-pass capacitor 32.

A rectifier 34, directed similarly to rectifier 31 has one terminal connected to the junction point of elements 12 and 13, and the other terminal connected through a blocking capacitor 35 to an output terminal 36 from which the code groups of pulses are obtained. The upper ends of the rectifiers 31 and 34 are connected by a resistor 37. It will be seen, therefore, that the rectifier 34 will be blocked until the junction point of elements 12 and 13 just equals $V_1$.

In order to explain the operation of the coder it will be assumed that a four-digit cyclic permutation code will be used to represent the sample pulses applied to terminal 9, though the circuit can be used for any number of digits without modification.

Figure 2:
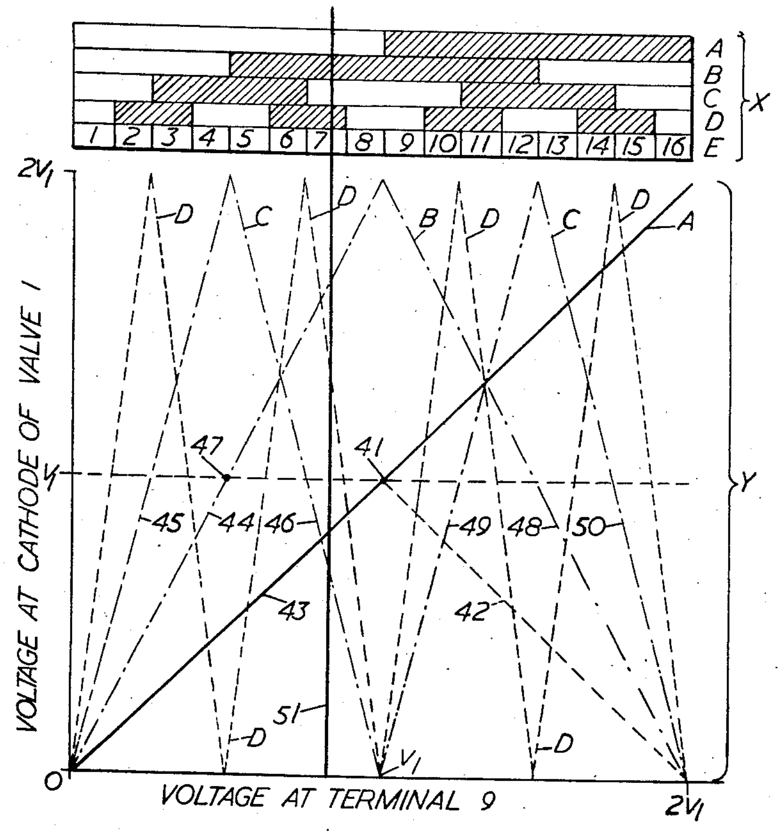
Fig. 2 shows a diagram used in the explanation of the operation of Fig. 1.

In Fig. 2, at X is shown a diagram of the four-digit cyclic permutation code. The horizontal scale represents the voltage amplitude of the sample pulse to be coded, referred to a zero at the left hand side. The shaded areas in the sections corresponding to the respective code digits 1 to 4 (designated A, B, C and D respectively) indicate that a code pulse is present in any digit position when the sample pulse amplitude corresponds to one of these shaded areas, but not otherwise. The fifth section of this diagram (designated E) shows the 16 quantised amplitude steps represented by the four digit code.

The abscissae of the graphs shown at Y in Fig. 2 represent the sample pulse voltage applied to terminal 9 of Fig. 1, and the ordinates represent the corresponding voltage at the cathode of the valve 1. Four straight-line graphs are shown labelled A, B, C and D. Graph A represents the relation between the voltage of the cathode of the valve 1 and the amplitude of the pulse applied to terminal 9. Since it has been assumed that the voltage gain ratio of the valve 1 is equal to 1, the graph A is a straight line through the origin inclined at 45° to the axes. It follows also that the horizontal voltage scale for the code diagram at the top of Fig. 2 is the same as the scale of abscissae of the graphs.

Graph B shows the relation between the voltage which appears at the cathode of the valve 1 after one transit round the coding loop through the valves 2, 3 and delay network 26, and the amplitude of the input pulse applied at terminal 9 in response to which the said voltage is produced. This curve is obtained in the following way. If it be supposed that the amplitude of the pulse applied to terminal 9 increases progressively from zero, the voltage applied to the control grid of the valve 2 will follow this increase, according to graph A, until this voltage reaches the value $V_1$ of the bias applied to the rectifier 31. At this point the rectifier 31 conducts and holds the potential of the centre tap of the autotransformer 13 fixed at the value $V_1$. This occurs at the point 41 where the graph A cuts the dotted bias line drawn at the level $V_1$ in Fig. 2. Thereafter, as the input pulse voltage increases above $V_1$ by a given amount, the potential of the right-hand end of the autotransformer winding 13 connected to the valve 2 must decrease below $V_1$ by the same amount on account of the transformer action which now takes place between the two halves of the winding, which should be closely coupled.

The potential applied to the control grid of the valve 2 therefore now decreases from $V_1$ to zero, as the pulse amplitude increase from $V_1$ to $2V_1$, as indicated by the dotted line 42 in Fig. 2.

The cathode of the valve 2 is connected to the centre point of the winding of the autotransformer 8, the two halves of which should be closely coupled, so that a step-up voltage ratio of 2 will be obtained. The voltage applied to the control grid of the valve 3 will therefore always be double that applied to the control grid of the valve 2; and so also will be the voltage which appears at the cathode of the valve 1 after ½ microsecond delay in the delay network 26. Thus the variation of the voltage at the cathode of valve 1 will be as shown in graph B, the ordinates of which are double those of the first part 43 of graph A up to the point 41, and the dotted line 42.

It has been assumed in this explanation that the gain ratio of each of the three valves is equal to 1, and that there is no attenuation in the delay network 26. In practice, none of these assumptions are exactly true, but accurate doubling of the voltage after passage once round the coding loop can be obtained by a small adjustment of the tapping point in the autotransformer 8 so that a voltage step-up ratio slightly greater than 2 is obtained.

It will now be clear from the explanation which has been given of the relation between the graphs A and B that during the second transit round the coding loop, the portion 44 of the graph B will give rise to a voltage at the cathode of the valve 1 represented by the two lines 45, 46 of graph C, the apex occurring at the abscissa corresponding to the point 47 where the line 44 crosses the bias line $V_1$. The line 48 of graph B will evidently give rise to another similar pair of lines 49—50 of graph C.

During the third transit round the loop it will be evident that each of the four lines 45, 46, 49 and 50 will give rise to a corresponding pair of lines of graph D, which therefore has four apices on the same ordinates as the points where the lines 45, 46, 49 and 50 cut the bias line $V_1$. The same process would continue in like manner indefinitely, each successive graph having double the number of apices as the preceding graph, but since in the present case only a four-digit code is required, a negative blocking pulse is supplied to terminal 22 (Fig. 1), by means not shown, to block the rectifier 17 through the rectifier 19 just after the third cycle has been completed, thus stopping any further operation. Thus the elements 18, 19 and 20 should be chosen so that initially a positive bias slightly greater than $2V_1$ is applied to the rectifier 17.

Since the bias applied to the rectifier 34 is $V_1$, it will be seen that a digit pulse can only be supplied to the output terminal 36 if the potential of the cathode of the valve 1 is equal to or greater than $V_1$. By reference to the graphs of Fig. 2Y it will be seen that this will happen when the abscissa of the input sample pulses amplitude corresponds to a portion of one of the graphs A, B, C, D, which is on or above the bias line $V_1$. It will be noted by comparing the code diagram of Fig. 2X with these curves that the portions of these graphs on or above the bias line $V_1$ correspond respectively with the shaded portions of the code diagram.

As a particular example, an ordinate 51 has been drawn across the graphs representing a sample pulse amplitude of about 0.8 $V_1$ lying in step 7 of the quantising scale E, Fig. 2X. This cuts shaded areas of the code diagram corresponding to the second and forth digits (labelled B and D), indicating pulses in these digit positions but not in the first and third positions. The ordinate 51 cuts graphs B and D, Fig. 2Y, above the bias line $V_1$, showing that digit pulses will be generated by the circuit of Fig. 1 in the corresponding digit positions. The ordinate 51, however, cuts the graphs A and C below the bias line $V_1$, showing that no digit pulses will be generated in the corresponding digit positions.

It will be appreciated that the auto-transformer winding 13 provides a very simple means according to the invention for producing the amplification characteristic in the inverted V form required for generating the cyclic permutation code. The circuit may evidently be arranged in various other ways. For example, the delay network 26 may be placed between the two valves 2 and 3 instead of after the valve 3, and the pulse after being delayed and after having its amplitude modified in the manner described may be fed to the output circuit of the valve 1 instead of the input circuit. If desired, amplitude compression may be applied in the manner described in the specification of a pending application Serial No. 513,404, filed June 6, 1955.

It should be mentioned that the output digit pulses obtained at terminal 36 will in general have various amplitudes, and may be applied to a suitable limiting device (not shown) to bring them all to the same amplitude. For example, the limiting device may be in the form of a suitable trigger circuit which on being triggered by a pulse from terminal 36 generates a corresponding pulse of a given fixed amplitude.

Figure 3:
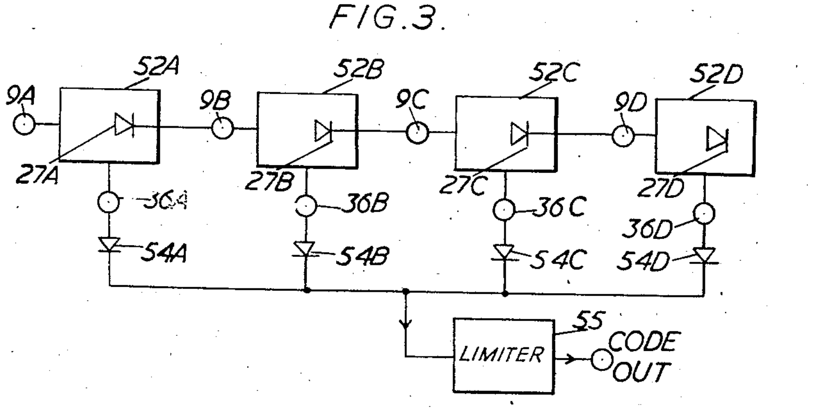
Fig. 3 shows a block schematic circuit diagram of a modification of the arrangement of Fig. 1.

Instead of generating the digit pulses by circulation in a closed loop, a slightly different arrangement indicated in Fig. 3 may be used. Four coding circuits 52A, 52B, 52C and 52D are arranged in cascade. Each of them is similar to Fig. 1 except that the conductor 53 connecting the rectifier 27 to the control grid of the valve 1 is disconnected therefrom and is connected instead to terminal 9 of the next following coding circuit. Thus the rectifier 27A of coding circuit 52A is connected to terminal 9B of coding circuit 52B, and the rectifier 27B of coding circuit 52B is connected to terminal 9C of coding circuit 52C, and so on. The original positive sample pulse to be coded is supplied to terminal 9A of the first coding circuit 52A.

The digit pulses corresponding to the first, second etc. code element positions are then obtained from the separate output terminals 36A, 36B etc., all of which are connected in common through isolating rectifiers 54A, 54B, etc. to a suitable amplitude limiter or trigger circuit 55.

It will be understood that the number of coding circuits 52 to be provided in cascade will be equal to the number of elements of the code, and coding automatically terminates with the operation of the last of them. Thus it is not necessary to provide a terminating pulse, so elements 17 to 23 of Fig. 1 can be omitted, the autotransformer 8 being connected directly to the control grid of the valve 3.

It should be pointed out that the potential used to bias the rectifiers 31 and 34 (Fig. 1) in each of the coding circuits 52A to 52D should be the same and may be derived from a single direct current source (not shown) common to all of them.

While the principles of the invention have been described above in connection with specific embodiments and particular modifications thereof, it is to be clearly understood that this description is made only by way of example and not as a limitation on the scope of the invention.

What I claim is:

1. An electric pulse coding arrangement for producing a code group of digit pulses according to the cyclic premutation code, comprising means for applying a sample pulse, the amplitude of which is to be translated into a corresponding code group of pulses, to the input terminal of an amplitude doubling amplifier through an autotransformer winding having a centre tapping point connected through a rectifier to a polarising direct current source of given potential in such manner that the rectifier is normally blocked, the arrangement being such that the potential applied to the said input terminal increases with increase of the amplitude of the sample pulse until the said amplitude reaches the given potential and then, after the rectifier becomes unblocked, decreases with further increase in the said amplitude, and means for generating a digit pulse when the amplitude of the applied sample pulse is equal to, or greater than, the given potential.

2. An arrangement according to claim 1 in which the output circuit of the voltage doubling amplifier is connected back to the said input terminal through a delay network and through the said autotransformer winding in order to form a closed coding loop.

3. An arrangement according to claim 2 comprising means for effectively interrupting the coding loop after all the digit pulses of the code group have been generated.

4. An electric pulse coding arrangement for producing a code group of digit pulses according to the cyclic permutation code comprising a plurality of coding circuits connected in cascade each including an input terminal connected to an output terminal through an autotransformer winding with a centre tap, an amplitude doubling amplifier and a delay device, means for applying a sample pulse, the amplitude of which is to be translated into a corresponding code group of pulses, to the input terminal of the first coding circuit of the cascade series, means for connecting the centre tap of each autotransformer winding through a corresponding rectifier to a direct current polarising source having a given potential in such manner that each rectifier is normally blocked, the arrangement being such that the potential applied to the input circuit of the amplitude doubling amplifier of any coding circuit increases with increase of potential applied to the input terminal of the said coding circuit until the last mentioned potential reaches the given potential, and then, after the corresponding rectifier becomes unblocked, decreases with further increase of the applied potential, and means in each coding circuit for generating an output digit pulse when the amplitude of the pulse applied to the input terminal of the said coding circuit is equal to or greater than the given potential.

5. A coding arrangement according to claim 1 in which the amplitude doubling amplifier, or each of them, comprises two cathode follower valve stages coupled by an autotransformer providing a voltage step-up ratio substantially equal to 2.

References Cited in the file of this patent

UNITED STATES PATENTS

| | | |
|---|---|---|
| 2,542,991 | Chatterjea et al. | Feb. 27, 1951 |
| 2,570,220 | Earp et al. | Oct. 9, 1951 |